US011898389B2

(12) United States Patent
Macdonald et al.

(10) Patent No.: US 11,898,389 B2
(45) Date of Patent: Feb. 13, 2024

(54) TILTING DOOR SYSTEM

(71) Applicants: Mark Macdonald, Ocala, FL (US); Ryan Bosco Dsouza, Ocala, FL (US); Morey Wilkerson, Ocala, FL (US)

(72) Inventors: Mark Macdonald, Ocala, FL (US); Ryan Bosco Dsouza, Ocala, FL (US); Morey Wilkerson, Ocala, FL (US)

( * ) Notice: Subject to any disclaimer, the term of this patent is extended or adjusted under 35 U.S.C. 154(b) by 153 days.

(21) Appl. No.: 17/080,328

(22) Filed: Oct. 26, 2020

(65) Prior Publication Data

US 2022/0127887 A1 Apr. 28, 2022

(51) Int. Cl.

*E05D 15/38* (2006.01)
*E06B 3/50* (2006.01)
*E06B 1/52* (2006.01)

(52) U.S. Cl.

CPC .............. *E05D 15/38* (2013.01); *E06B 1/522* (2013.01); *E06B 3/5018* (2013.01); *E05Y 2201/684* (2013.01); *E05Y 2900/106* (2013.01); *E05Y 2900/108* (2013.01); *E05Y 2900/132* (2013.01)

(58) Field of Classification Search

CPC ....... E05D 15/38; E06B 1/522; E06B 3/5018; E05F 15/668

See application file for complete search history.

(56) References Cited

U.S. PATENT DOCUMENTS 663,989 A * 12/1900 Wilson .................... E05D 15/38 49/197
2,575,201 A * 11/1951 Tillotson ............... E05D 15/408 16/94 R
4,765,093 A 8/1988 Edwards
5,337,520 A * 8/1994 Uribe ...................... E05D 15/38 49/203
6,056,037 A * 5/2000 Jonkman, Sr. ........ E05D 15/262 49/362
8,245,446 B2 8/2012 Betker
8,539,716 B2 9/2013 Betker
8,769,871 B2 7/2014 Betker
9,015,996 B2 4/2015 Betker
9,091,107 B2 7/2015 Betker
9,273,507 B2 3/2016 Petrat
9,404,301 B2 8/2016 Betker
9,428,951 B2 8/2016 Betker
9,631,418 B2 4/2017 Crown
10,208,529 B2 2/2019 Betker
2016/0312512 A1* 10/2016 Houser ................ E05D 13/003

(Continued)

FOREIGN PATENT DOCUMENTS

GB 2 155 991 * 10/1985

*Primary Examiner* — Gregory J Strimbu

(74) *Attorney, Agent, or Firm* — Gerard H. Bencen, ESQ; PATENT-ARTS

(57) ABSTRACT

A tilt-up door having vertical side members each having a pivot point, the pivot points move upward or downward when an actuator is activated to move the door between open and closed positions. First and second cams connected to the vertical side members at a lower end of the cams, each of said cams extend from the lower end thereof upwardly and arcuately toward an interior of a building to a distal terminal end thereof, each of the ends contacts a cam follower. The cam followers slide along the first and second cams and guide the first and second cams and the door as the door moves between the open and closed positions.

11 Claims, 5 Drawing Sheets

(56) References Cited

U.S. PATENT DOCUMENTS

2016/0376830 A1* 12/2016 Crown .................... E05D 15/38
49/199
2018/0002971 A1* 1/2018 Grace ..................... E06B 3/483

* cited by examiner

TILTING DOOR SYSTEM

FIELD OF THE INVENTION

Tilting door systems, methods and related devices.

BACKGROUND OF THE INVENTION

The invention relates to doors for buildings such as airplane hangars, farm equipment storage buildings, marine storage buildings, heavy equipment storage buildings, garages, commercial & residential, and the like. It is known for such buildings to have doors that pivot up to an open position to allow the stored equipment to be moved into or out of the building. For door openings wider than about eight feet (8'), conventional sectional overhead doors are typically not used because of the span and the problem of preventing door panel sections from sagging in the middle as the door is opened. It is known for a single panel door to include a truss to support the door to preclude sagging of the door in the open position.

Reference is herein made to the following art which is also herein incorporated by reference for teachings of the general state of the art as it relates to conventional and known tilt-up doors in contrast to which, surprisingly, the present invention provides a unique contribution to the possibilities for achieving the objectives common to these references and the present invention, namely, provision of a tilt-up door: "Betker" (U.S. Pat. Nos. 8,245,446; 8,539,716; 8,769,871; 9,091,107; 9,015,996; 9,404,301; 9,428,951; and 10,208,529); "Edwards" (U.S. Pat. No. 4,765,093); "Petrat" (U.S. Pat. No. 9,273,507), and "Crown" (U.S. Pat. No. 9,631,418).

SUMMARY OF THE INVENTION

The invention relates to a tilt-up door for a building having a relatively wide door opening to be closed by a door having dimensions that are substantially equal to, but sufficiently less than the dimensions of the door opening to permit the tilt-up door to freely open from and close into the door opening. The tilt-up door according to this invention is tilted to a vertical closed position in a closing cycle, and, in an opening cycle, is tilted to a generally or substantially horizontal open position. During a closing cycle, the tilt-up door moves from the substantially horizontal open position to the substantially vertical, closed position.

The tilt-up door according to this invention in its closed vertical position includes a door frame comprised of two vertical columns with a roller assembly as well as roller assembly supports. The door panel is comprised of a bottom rail, top rail (each also commonly referred to as "girts") and left and right vertical side member, as further described herein below, along with further members, including, for example, one or more trusses, clips, fasteners, panel track assembly, weather seals, and the like, all designed to accommodate a variety of external cladding options.

In one embodiment, in its closed, vertical position, each of the at least two left and right vertical side members includes a pivot point positioned between the top and bottom horizontal members thereof, to permit pivoting of the tilt-up door around the pivot points as the door is opened and closed. Pivot points, including pivot shafts and the like, are well known in the art and may be used in any configuration to permit the tilt-up door according to this invention to rotate about each pivot point, as needed and as further described herein below.

In a preferred embodiment according to this invention, the door frame includes first and second cams, each connected to one of the at least two vertical side members of said tilt-up door, each of said cams affixed at its lower aspect to each side member at a position at or slightly above the center point of the door frame, and each cam extending upwardly and arcuately toward the interior of the building, to a point in space where said cam contacts a cam follower which is extended inwardly at approximately a right angle with respect to both the adjacent top horizontal member, and to the vertical member to which it is fixed at its proximate end, thereby causing the door to open into its horizontal position by following each said cam, and to be lowered into its vertical closed position, also by following each said cam.

DETAILED DISCLOSURE OF THE PREFERRED EMBODIMENTS OF THE INVENTION

Figure 1:
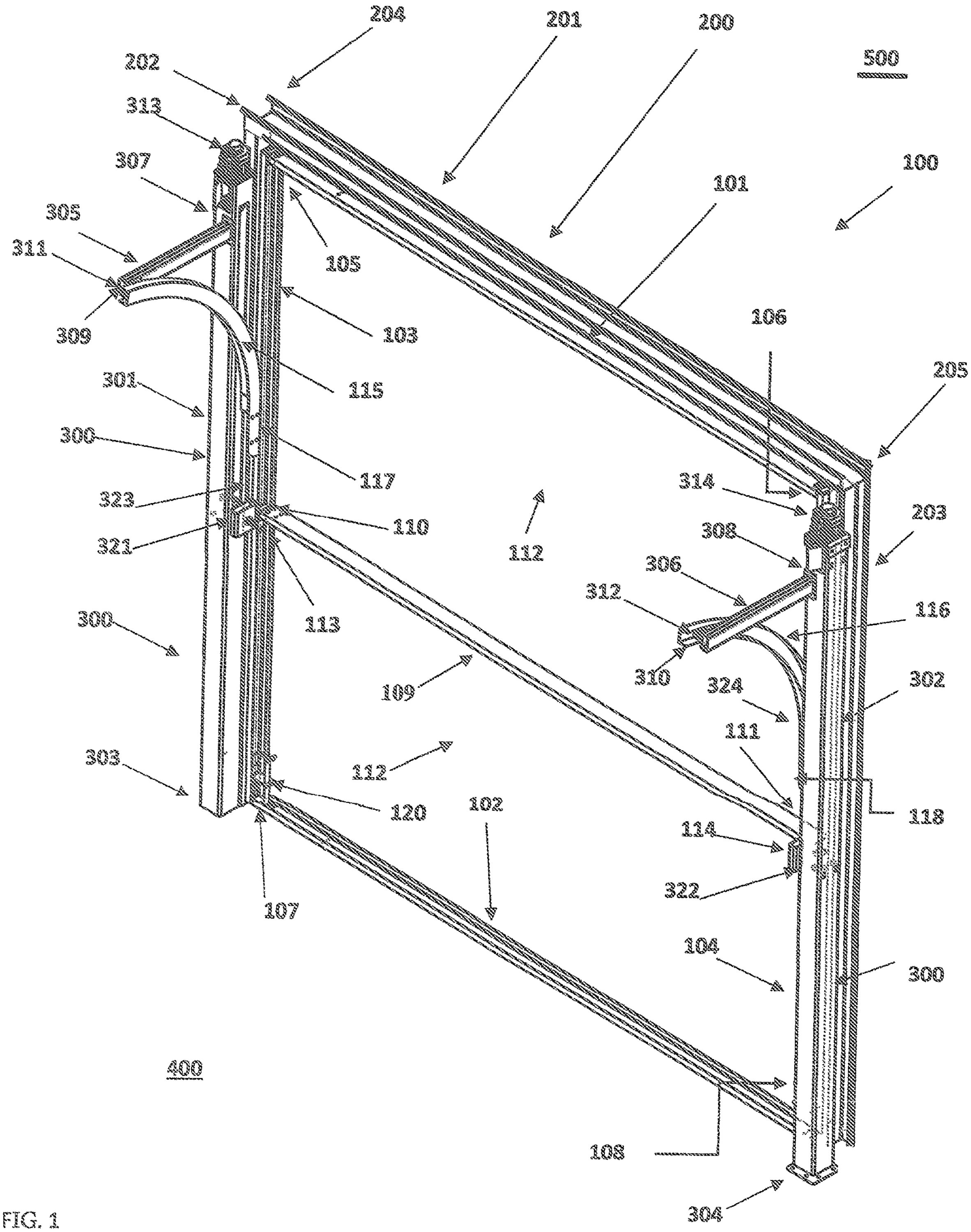
FIG. 1 is an elevational view of a tilt-up door 100 according to the invention installed in an appropriately dimensioned opening in a building, viewed from the inside 400 of a building in which it is installed toward the exterior 500 thereof, with the door in its vertical, substantially closed position.

Those skilled in the art relating to doors for large buildings such as airplane hangars, farm equipment storage buildings, marine storage buildings, heavy equipment storage buildings, garages, and the like, will appreciate from the present disclosure the novel and inventive features of this invention, which provides an advancement and contribution to the art. This invention is particularly applicable to but is not exclusively useful with reference to such buildings having doors that pivot up to an open position to allow the stored equipment to be moved into or out of the building. For door openings wider than approximately eight feet (8'), conventional sectional overhead doors are typically not used because of the span and the problem of preventing door panel sections from sagging in the middle as the door is opened, and to be sufficiently structurally sound to withstand wind loads, as well as positive and negative loads in the course of location and rotation of the door panel between its open and closed positions. It is known for a single panel door to include a truss to support the door to preclude sagging of the door in the open position. Those skilled in the art will appreciate that while the present invention is particularly applicable to closure of openings wider than eight feet (8') and may be applicable openings somewhat smaller than that or openings several fold larger than that. Commercial or domestic garage doors are included in applications for the present door and system.

The invention relates to a tilt-up door for a building having a relatively wide door opening to be closed by a door having dimensions that are substantially equal to but sufficiently less than or slightly more than the dimensions of the door opening to permit the tilt-up door to freely open from and close into or over the door opening. The tilt-up door according to this invention is tilted to a vertical closed position in a closing cycle, and, in an opening cycle, is tilted to a generally or substantially horizontal open position. The tilting style door disclosed herein is used in structures where large openings allow for the movement of larger materials or equipment, venues where the need for people in large settings such as arenas to enter and exit, as well as permitting the opening of a side of a building to convert an enclosed building structure into an open structure. Those skilled in the art will appreciate that the term "substantially" as a modifier of open, closed, vertical or horizontal, means that the mechanisms disclosed herein can be operated to completely or incompletely open, close, set at a vertical or horizontal position, and slight deviations from absolute closure or opening, vertical or horizontal position, do not depart from the scope of this invention and the appended claims.

Definitions and Numbering of Elements of Various Aspects and Embodiments of the Invention Various embodiments of the invention will be further understood with reference to the FIGS. 1-5 provided with this patent application filing, which show various embodiments, views, cross-sections, and angles of elevation, as needed to emphasize and make clear different aspects of the invention. In these Figures, like elements in the various views are identically numbered or are not numbered at all to avoid obscuring the various views by adding un-necessary numbering. The numbering convention followed in the figures is:

For elements of the invention which constitute the tilt-up door 100 itself, including the door frame, the door panel(s), the numbering used is in the 100-199 series.

The numbering of elements in the 200-299 series is reserved for use in describing structures which are essentially fungible to the invention, but which are preferably present in one form or another defining an opening in a building, in the context of which embodiments of the invention cooperatively interact including elements of the invention in the 100-199 and 300-399 series of elements of the tilt-up door 100 such that it operates correctly as described herein to open and close thus revealing and closing the opening in a building. All structures in the 200-299 series are shown in dashed lines as not formally constituting the invention, as the invention as described herein may operate perfectly well without such elements being present.

The 300-399 series of elements of the invention is utilized in relation to Support Structure and Actuation elements of the invention for causing the interacting mechanisms of the 100-199 series of elements, including for example, providing power, drive mechanics, to open or close the tilt-up door 100.

The 400 and 500 series of numbers provide orientation of the views, as shown in each figure, in relation to the inside 400 and outside 500 of a building in which the tilt-up door 100 and associated mechanisms in the 200-399 series, as described herein, is installed. Thus, the depiction of the present invention shown in FIG. 1 is viewed from within 400 a building when viewed toward the exterior 500 of a building, having a sufficiently large opening of appropriate dimensions to accommodate the installation of the tilt-up door 100 according to this invention disclosure.

Accordingly, as used herein, the following terms have the following meanings:

Cam—a track made of durable material, preferably metal, of such shape as described herein, including an arcuate but flat surface, also including a channel, to guide a Cam Follower, which rides on the Cam Surface and as necessary, including where a channel is provided, the Cam Surfaces, as shown, described, and exemplified in the accompanying and non-limiting drawings, e.g. see FIG. 1, elements 115 and 116, each of which is affixed to the tilting component of the door 100, including the door frame and associated components in the 100-199 series of elements.

Cam Follower—includes but not limited to a roller or like mechanism of sufficient durability to ride on the Cam Surface(s), as shown, described, and exemplified in the accompanying and non-limiting drawings, e.g. see FIG. 1, elements 311 and 312, and the related elements in the 300-399 series of elements.

Door Frame—means the door frame defined by vertical and horizontal elements 101-104, their juncture points at 105-108, cross brace 109 and its juncture points with the frame elements 110-111 and related elements of the 100-199 series of invention elements.

Support and Actuation Structure, 300, referred to herein as stiles or columns, as described herein are affixed to a floor, including, e.g. by being bolted to concrete, as shown, described, and exemplified in the accompanying and non-limiting drawings, including e.g. as shown in FIGS. 1, 303 and 304, on either side of the door 100. The Support and Actuation Structures and the related elements in the 300-399 series of elements, may be further stabilized for example by being bolted or welded or included within the U-shape of U- or I-shaped beams if such are used to form components in the 200-299 series of components, reserved for describing structures which are essentially fungible to the invention, but which are preferably present in one form or another defining an opening in a building, in the context of which embodiments of the invention cooperatively interact. Thus, those skilled in the art should understand that the invention as disclosed herein may be free-standing, or it may be bolted to, or incorporated into the structures defining an opening in a building. While implemented in a distinctly different device and system, an example of the incorporation of Support and Actuation Structures into the U-shaped beams forming the opening of a building can be found in, for example, Betker, U.S. Pat. No. 8,245,446, herein incorporated by reference for its teaching, for example, at column 5, lines 12-64. The stiles are preferably reinforced so as to minimize load on the surrounding building and wall opening structures.

The types of tilting doors known in the art range from swings, to folding, and lifting, type doors. They have used hydraulic, screws, cables, sheaves, chains and other various actuators, as disclosed and exemplified in detail in the art cited herein above.

The balancing tilting style door of the present invention allows for a reduction in the steel requirements for the framing of the building itself and creates a partial canopy outside the opening as well as inside, when the tilt-up door 100 is in its open position.

In one embodiment according to this invention, the balancing tilt-up door 100 and its related systems as described herein, comprises:

Support Structures, 300, also referred to herein as stiles or columns, are fixed to a stationary base such as concrete as designed by a structural engineer, on either side of a door opening in a building. The columns secure the actuation system which may include but are not limited to: hydraulics, screws, chains, cable, belts, chain over hydraulic, or the equivalent, all of which may be encompassed within the stiles of said Support Structures 300. The drive system for opening and closing the tilt-up door 100 of this invention is powered by a conventional control panel or remote buttons that send a signal to a programmable logic controller or, in its simplest form, to power one or more motors, as exemplified in detail herein below, to raise and lower the pivot points 113 and 114. Preferably the Support Structure contains all of the actuation mechanisms described in the 300-399 series of elements which, in combination with the 100-199 series of elements forms an operative system of the invention, whether structures in the 200-299 series of components are present or not.

A control system for actuating the movement of the door between its open and closed positions can be operated via wired or wireless analog, digital, WiFi, BLUETOOTH®, or like communication and powering channels, alone or in combination. The actuators or hydraulics mounted to the door frame or door jamb, move a pivot point on the door frame, causing the door to rise out of the closed position and to the open position as further described herein below.

Preferably, cams, mounted on the door frame, are provided with an engineered path that enables the door to open at a desired pre-determined degree, up to roughly 90 degrees or from a vertical plane to a horizontal plane. The actual degrees the door can move may be less than 90 degrees for purposes of water shed toward the exterior of the opening. The cams are fixed to the door frame forming a channel that allows a rolling cam follower affixed to the Support and Actuation Structure 300 at the upper end thereof and extended to the correct location in three-dimensional space by cam follower support bars, to fit inside the annular space of each cam, to thereby define the path that the door travels as the cam follower rides within each cam. This space can vary depending upon the system and the desired engineered path. This guide also serves as a stabilizing point for the upper portion of the door system when in the full upright position.

Detailed Description of Preferred Embodiments Exemplified in the Figures

With reference first to FIG. 1, which provides an elevational view from the inside of a building 400, toward the exterior 500, the view of which is obstructed by the tilt-up door 100 according to this invention, shown in its substantially closed, substantially vertical position. In this view can be seen an embodiment of the tilt-up door 100 including and comprising a door frame formed at least from a top 101 and a bottom 102 horizontal member, and at least two vertical side members, 103 and 104, connected to the top horizontal member at corners 105 and 106 and to the bottom horizontal member at corners 107 and 108 at opposite ends of the top and bottom horizontal members, to form a substantially square or rectangular frame for the tilt-up door 100, depending on the substantially equal length of the top and bottom members 101 and 102 in relation to the substantially equal length of the two vertical side members 103 and 104.

Optionally, but preferably, the tilt-up door 100 further comprises at least one reinforcing cross-brace or strut 109 affixed to both the left and the right vertical members 103 and 104 at or near the midpoint 110 and 111 of each such vertical member, or at regular intervals there-along. Optionally, not shown, either instead of or in addition to said at least one reinforcing cross-brace or strut 109, similar but vertically oriented reinforcing cross-braces or struts are may in addition be provided, affixed to said top 101 and said bottom 102 horizontal members, to said cross-brace or strut 109, if present, either more or less in the middle of each such horizontal member, or at regular intervals there-along. Of course, diagonal arrangements of cross-braces and struts would be included within the ambit of the claims appended to this disclosure, whether alone or in any combination with vertical or horizontal cross-bracing or struts.

Those skilled in the art will appreciate that the frame of the tilt-up door 100 of this invention as described above, comprises members 101, 102, 103, 104, and 109, affixed to each other at points 105, 106, 107, 108, 110, and 111. Each member of said door panel is manufactured or manufacturable by methods known in the art, from a wide variety of engineered materials, including but not limited to, aluminum, steel, various alloys, and combinations thereof. The fixation points, 105, 106, 107, 108, 110, and 111, are optionally secured to each other by various means and methods known in the art, including but not limited to via welds, bolts, brackets, or the equivalent. Furthermore, those skilled in the art will appreciate that enclosed within the door frame defined by members 101, 102, 103, 104, and 109, affixed to each other at points 105, 106, 107, 108, 110, and 111, there is provided a barrier 112, which itself may be manufactured from one or more sheets of metal, including but not limited to aluminum, steel, various alloys, and combinations thereof, wood, plastic, or other materials of sufficient strength and of sufficiently light-weight material to create a stable, solid and impervious barrier to the outside of the building, 500 as is required under the circumstances. Such considerations would also dictate the need for more than the non-limiting single cross brace 109 exemplified in FIG. 1, as described herein above. All peripheral edges of barrier 112 are, of course, preferably, affixed to door frame components defined by members 101, 102, 103, 104, and 109 by methods known in the art, including but not limited to via welding, riveting, bolting, clamping, grommets and tie-downs, or equivalents thereof. Points of fixation of 112 include at least the four corners defined at 105, 106, 107, and 108, and preferably also points 110 and 111 of 109. Of course, in a most preferred embodiment, the points of fixation are all along, all peripheral edges of barrier 112.

As depicted in FIG. 1, the view of the tilt-up door 100 is from the interior of a building 400, with the tilt-up door 100 in its vertical, closed position, thus obscuring the exterior 500 of the building. The space in the building into which the door 100 is installed is defined in this figure by elements in the 200-299 series defining an opening in a building 200, including but not limited to top beam 201, left- and right-side beams 202 and 203 respectively. Each such beam may include a web and spaced flanges forming a generally U-shaped channel connected to the building and extend vertically along opposite sides of the door opening with the generally U-shaped channels facing each other and the door opening. Those skilled in the art will appreciate that even in the absence of top beam 201, the present invention would operate perfectly well as there is no requirement that such a beam be present, nor, in fact is it required for beams 202 or 203 to be present. Accordingly, all elements in the 200-299 series of components described herein are shown in dashed lines in the figures.

As is shown, the tilt-up door 100 includes, affixed to each said vertical member 103 and 104, pivot points, 113 and 114, each affixed to a point on each vertical member 103 and 104 of the door frame of the tilt-up door 100, as shown, and as further shown and described herein below. It should be noted that pivot points 113 and 114 are situated at, near, slightly above, or slightly below the midpoint of each vertical member 103 and 104, with respect to the horizontal members 103 and 104 of the frame so as to accommodate pivoting of the door frame as required to permit cam followers 309 and 310, as described further herein below, to follow the arcuate inwardly directed path defined by cams 115 and 116. The tilt-up door 100, as needed, rotates around each said pivot point, 113 and 114, as the door is moved between its closed, vertical position and its open, horizontal position, as further described herein below. As also further described herein below, and as can be seen in FIG. 1 and subsequent figures and views, pivot points 113 and 114 are or may be conjoined with pivot translation points, 321 and 322, so that when such points translate upward or downward, this causes the pivot points 113 and 114 to likewise translate upward or downward, while also permitting the tilt-up door 100 to pivot as needed, as directed by cams, as further described below.

In a preferred embodiment according to this invention, the tilt-up door 100 includes first and second cams 115 and 116, each respectively affixed to one of the at least two vertical side members 103 and 104 of said tilt-up door 100, each of said cams affixed at its lower, proximal, end to each side member 103 and 104 respectively, at a fixation point 117 and 118 at or slightly above the center point of the vertical side members 103 and 104 of the door frame, each said cam 115 and 116 extending arcuately both upwardly and inwardly toward the interior 400 of the building, to a distal end thereof 309 and 310, respectively, said distal ends 309 and 310 each, respectively, engaging with a cam follower, 311 and 312, as further described herein below. Each said cam follower 311 and 312, is borne at the distal end of each of two substantially horizontally oriented cam follower support bars 305 and 306, each oriented at approximately a right angle with respect to both the adjacent top horizontal member 101, and to each vertical member 103 or 104. Each cam follower support bar 305 and 306 is affixed at the proximate end thereof to a point 307 and 308 to each support column 300 sufficiently near the top end of each said support structures at 301 and 302 to properly position the distal ends thereof to enable each cam follower 311 and 312 to ride within and follow each cam 115 and 116 when pivot translation points 321 and 322 and conjoined pivot points 113 and 114 translate upward or downward, while also permitting the tilt-up door 100 to pivot as needed.

From the foregoing disclosure, it will be apparent to those skilled in the art that the door frame contains an integral track or cam which is substantially elliptical having a radius such that each integral track rides on a stationary Cam Follower, including but not limited, to for example, on a stationary steel, polyester, or other material forming a roller, which allows the frame to tilt into position as the Cam Follower rides within and in contact with the Cam. The actuation system is mounted on or in columns on either side of the door to allow the door to move into the various open and closed positions. Each cam may have an initial substantially straight and vertical portion, an arcuate portion having a defined radius, and a final, substantially straight portion. Alternatively, those skilled in the art will appreciate that the cam may simply define an arcuate path with a defined, substantially circular or elliptical radius, and variations therein as needed for a particular tilt-up door 100 installation.

Each support structure 301 and 302 is affixed to the ground by means known in the art, including but not limited to, via bolting to the ground by known fixation means, including but not limited to use of "all thread"), fixed in concrete set in the ground, at the bottom ends, 303 and 304, thereof. Each such column, for added stability, is preferably also affixed to the door frame vertical structures, 202 and 203, if present, by means known in the art, including but not limited to via welds, bolts, brackets, or the equivalent and combinations thereof.

In a preferred embodiment, each said support structure, 301 and 302, is preferably hollow but also sufficiently strong to contain and support all of the elements and functionalities required by the elements of each embodiment of this invention, as described herein.

Each said support structure, 301 and 302, is represented in FIG. 1 and subsequent figures as a column, preferably, but not necessarily exclusively, made from steel, with any steel shape, as appropriate for the size of the door. Each said column is of sufficient strength and height so that each preferably contains and supports actuator mechanisms, known in the art, including, for example, motors, hydraulics, cables, or the like, which, when actuated, causes pivot translational points 321 and 322 to be raised or lowered to desired vertical points, including the extrema corresponding with the substantially horizontal, substantially open, and the substantially vertical, substantially closed positions of the tilt-up door, 100, and to every and any intermediate position desired, achieved by interruption of the operation relevant actuator mechanisms, such as are known in the art and which are described further herein below.

Actuator mechanisms are known to achieve, for example, and not by way of limitation, vertical translation up and down of said pivot translational points 321 and 322. By way of further example and not limitation, in one embodiment according to the invention, motors 313 and 314, represented in FIG. 1, are provided. When motors 313 and 314 are concurrently activated, and retained in synchrony with each other using control mechanisms, as well as power, and circuitry requirements, known in the art, including in the herein-above cited art, a length of for example, threaded drive mechanism, or the like to act as a screw-drive, preferably rotatably engaged, at a top end thereof with each said motor, and at the bottom end thereof, is rotatably affixed to a support within each said support structure, 301 and 302. Each said drive mechanism is preferably enclosed within each said support structure 301 and 302 and is caused by each said motor 311 and 312 to rotate, clockwise or counter-clockwise, depending on whether the intention of the operator is to open or close the tilt-up door 100.

Thus, for example, when each motor is caused to rotate in a said clockwise or counter-clockwise direction, viewed from above, each said pivot translation point, 321 and 322, is caused to translate vertically upward or downward along each threaded drive due to inclusion of appropriately matching threads, as part of each said pivot translation points, 321 and 322, to cause each pivot point 113 and 114 which are or may be conjoined with pivot translation points, 321 and 322, to move so that when such points translate upward or downward, this causes the pivot points 113 and 114 to likewise translate upward or downward, while also permitting the tilt-up door 100 to pivot as needed.

As pivot points 113 and 114 are affixed to vertical members 103 and 104 and to pivot translation points 321 and 322, channels 323 and 324 defined in each of said support structures, 301 and 302, are provided, vertically above the resting point depicted in FIG. 1 for a substantially vertical, substantially closed position of the tilt-up door 100, to permit the connection between these elements to travel freely and be guided by the engineered tracks 323 and 324. Each said track system, 323 and 324, acts as a guide because each such pivot point 113 and 114, is pivotally affixed to a point on each vertical member 103 and 104 of the frame of the tilt-up door 100, at, near, slightly above, or slightly below the midpoint between the top and bottom horizontal members 101 and 102 of the frame so as to accommodate pivoting of the door frame as required to permit cam followers 309 and 310 to follow the arcuate inwardly directed path defined by cams 115 and 116. Thereby, the tilt-up door 100 rotates around each said pivot point, 113 and 114, to permit movement of the door between a substantially closed, substantially vertical position and a substantially open, substantially horizontal position. To lock the door in its substantially vertical, substantially closed position, a lock mechanism 120 is provided whereby a rod is dropped through a slot in the bottom member 102 into a preferably reinforced hole or receptacle in the ground. Before the door is moved from its substantially vertical, substantially closed position, to its substantially horizontal, substantially open position, the lock mechanism is disengaged by lifting the rod out of the receptacle in the ground.

Figure 2:
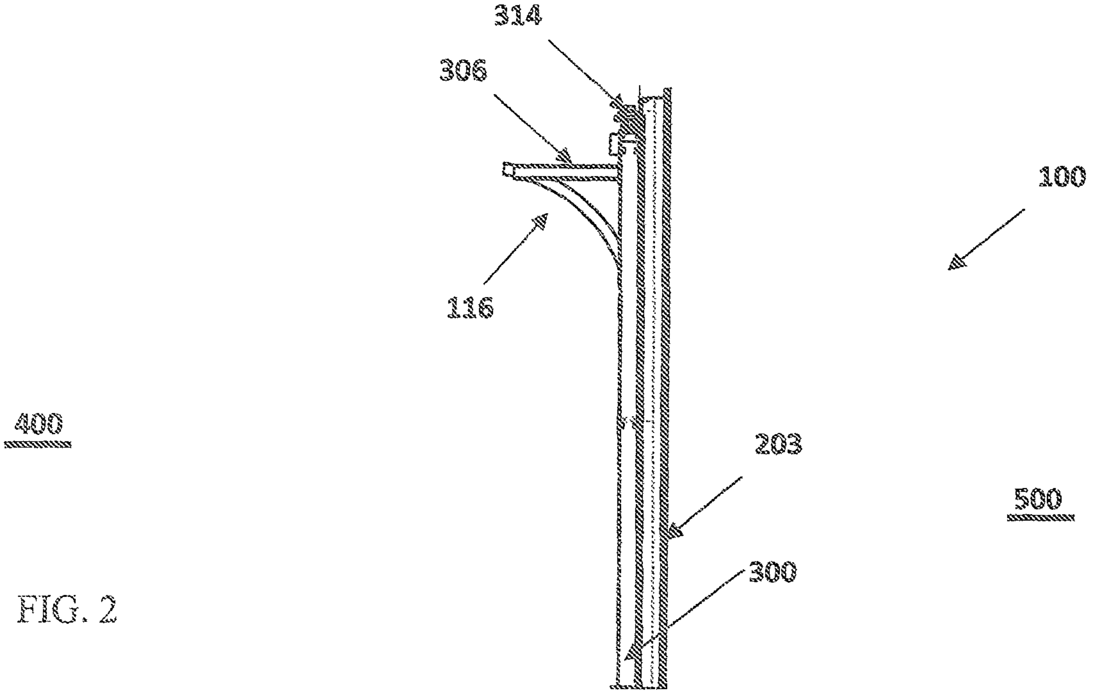
FIG. 2 shows the door 100 viewed from the right side of the view depicted in FIG. 1 with the door 100 in its substantially vertical, closed position.
Figure 2A:
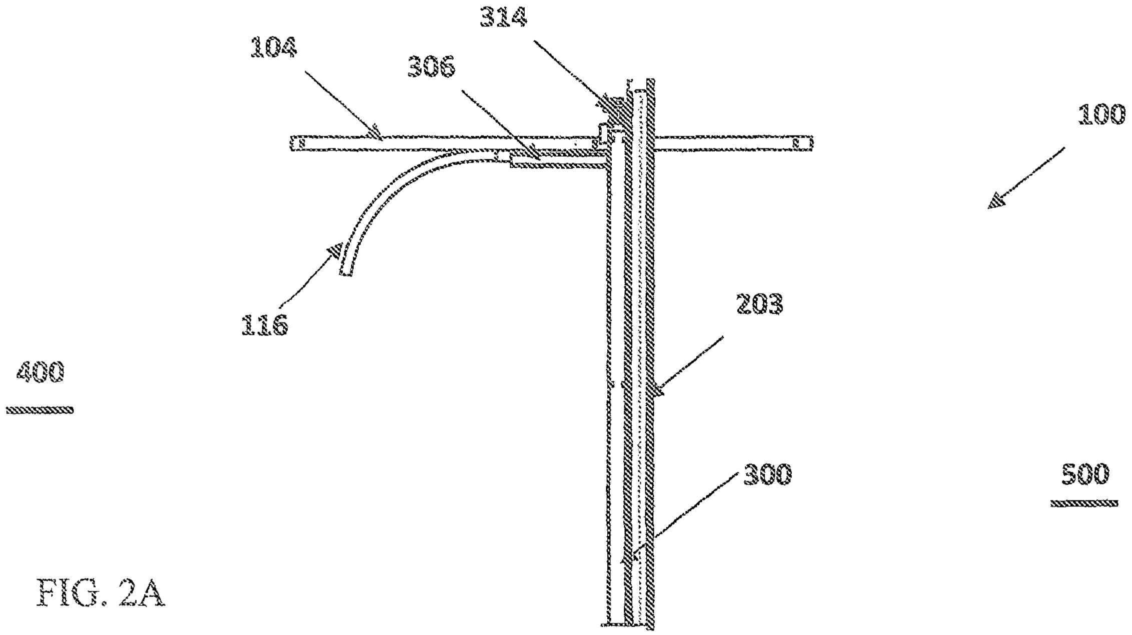
FIG. 2A shows the door 100 viewed from the right side of the view depicted in FIG. 1 with the door 100 in its substantially horizontal, open position.

Referring now to FIGS. 2 and 2A, each showing a side view of the tilt-up door 100 as shown in FIG. 1, installed in a building, but viewed from a position wherein the interior 400 of the building is to the left of the viewer and the exterior 500 of the building to the right of the viewer. In FIG. 2, the tilt-up door 100 is depicted in a substantially closed, substantially vertical position. In FIG. 2A, the tilt-up door 100 is depicted in a substantially open, substantially horizontal position. Also evident are various elements in the 200-399 series of elements which are best seen when viewed from this perspective.

Figure 3:
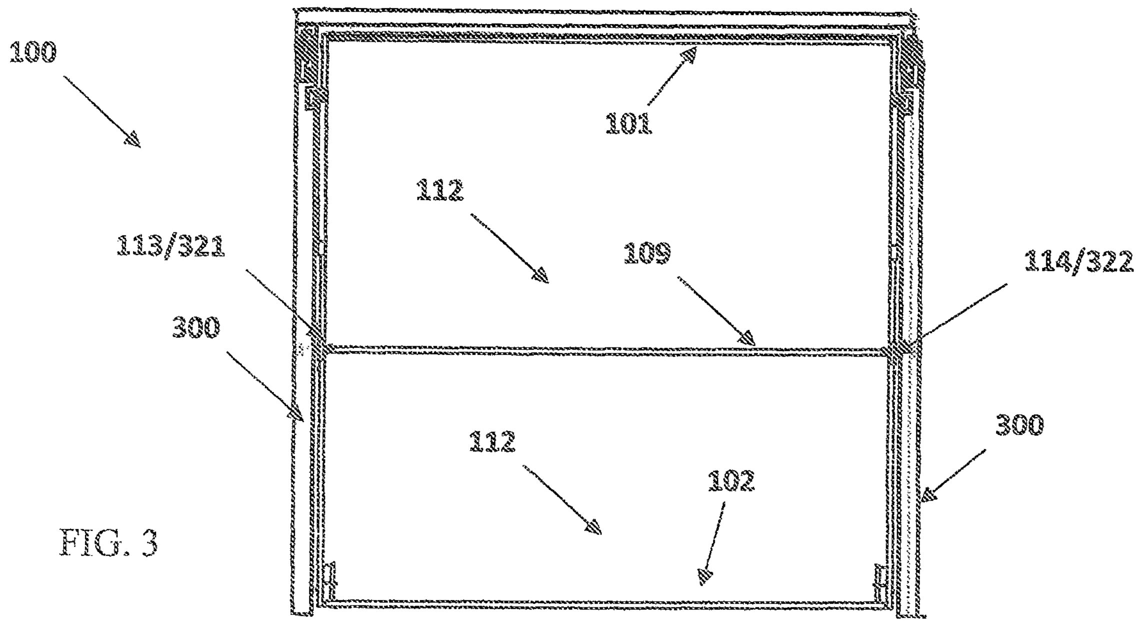
FIG. 3 shows the door 100 viewed directly from the inside 400 of a building in which it is installed toward the exterior 500 thereof, with the door 100 in its substantially vertical, closed position.
Figure 3A:
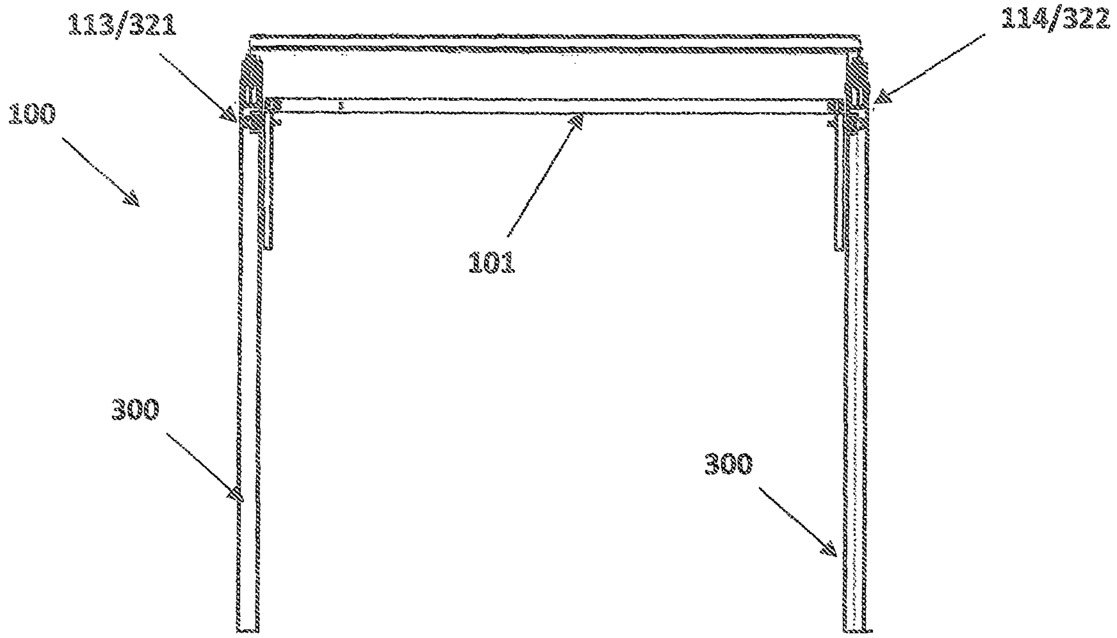
FIG. 3A shows the door 100 viewed directly from the inside 400 of a building in which it is installed toward the exterior 500 thereof, with the door 100 in its substantially horizontal, open position.

FIGS. 3 and 3A show the door 100 viewed directly from the inside 400 of a building in which it is installed toward the exterior 500 thereof, with the door 100 in its substantially vertical, closed position (FIG. 3), and in its substantially horizontal, open position, (FIG. 3A), respectively. The top edge 101 can be seen in FIG. 3A, tilted into the interior 400 of a building. The position of the pivot translation points 113/321 and 114/322 at their lowest, substantially closed, substantially vertical position of the door 100 can be seen in FIG. 3, while in FIG. 3A, the position of the pivot translation points 113/321 and 114/322 at their highest, substantially open, substantially horizontal position of the door 100 can be seen.

Figure 4:
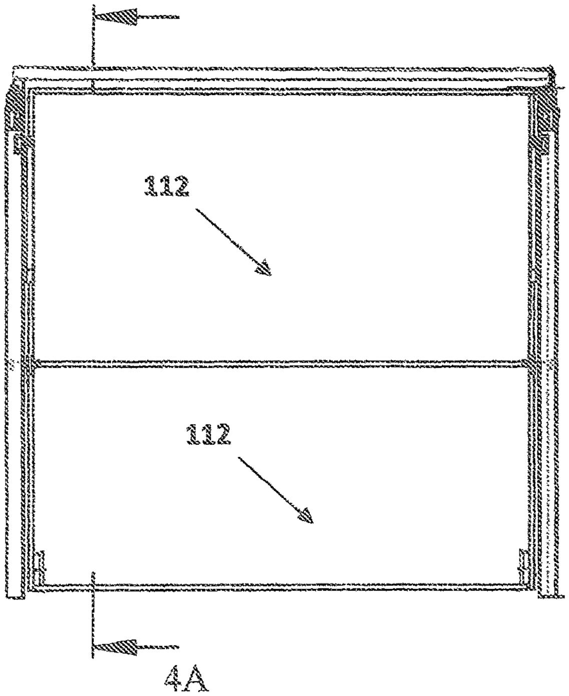
FIG. 4 shows the door 100 viewed directly from the inside 400 of a building in which it is installed toward the exterior 500 thereof, with the door 100 in its substantially vertical, closed position.
Figure 4A:
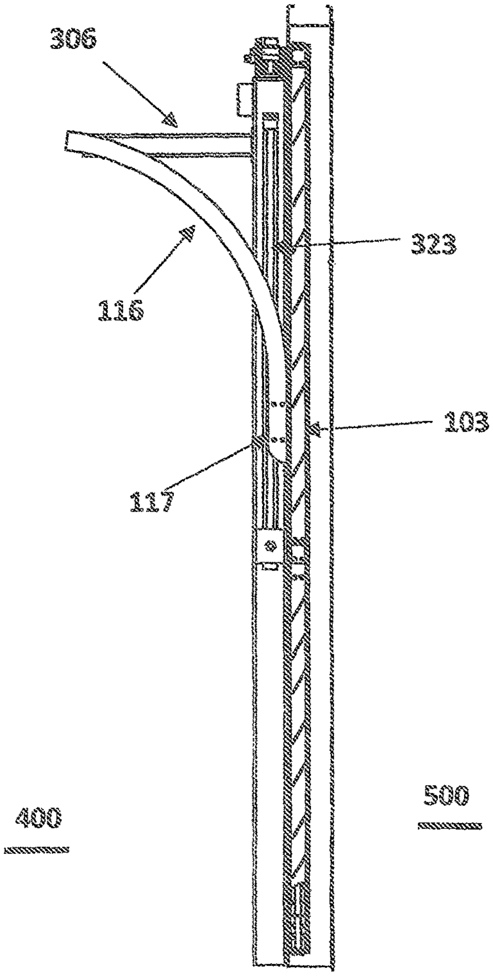
FIG. 4A shows the door 100 along the section line 4A-4A with the door 100 in its substantially vertical, closed position.

FIGS. 4 and 4A show the door 100 viewed, in FIG. 4, directly from the inside 400 of a building in which it is installed toward the exterior 500 thereof, with the door 100 in its substantially vertical, closed position, and in FIG. 4A, with the door 100 in its same substantially vertical, substantially closed position, but viewed from the side along section lines 4A-4A, toward the far end of the door 100. In these views, engineered track 323 can best be seen, as can the fixation point 117 of the proximal end thereof to vertical frame member 103 is also clearly shown.

Figure 5:
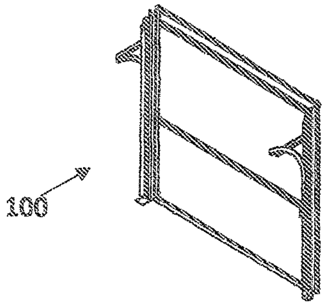
FIG. 5 shows the door 100 in a substantially vertical closed position.
Figure 5A:
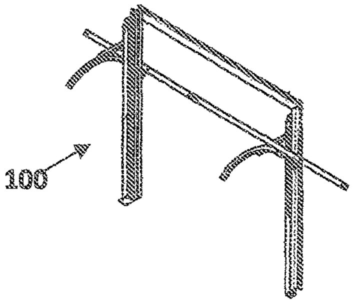
FIG. 5A shows the door 100 in a position intermediate substantially open and substantially closed positions.
Figure 5B:
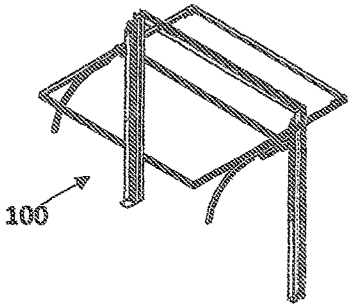
FIG. 5B shows the door 100 in a substantially open position.
Figure 5C:
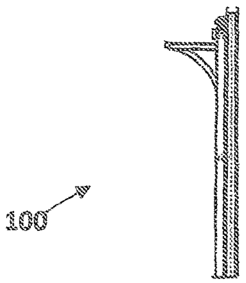
FIG. 5C shows a side view of the door 100 in a substantially vertical closed position.
Figure 5D:
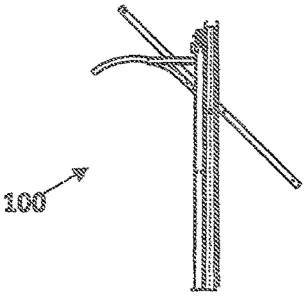
FIG. 5D shows a side view of the door 100 in a position intermediate substantially open and substantially closed positions.
Figure 5E:
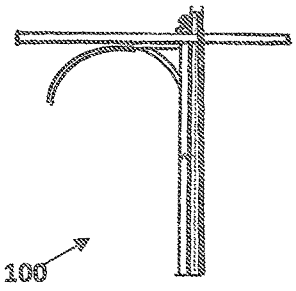
FIG. 5E shows a side view of the door 100 in a substantially open position.
Figure 5F:
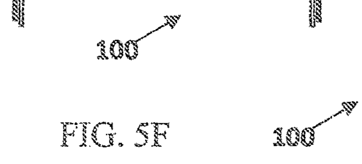
FIG. 5F shows a top view of the door 100 in a substantially vertical closed position.
Figure 5G:
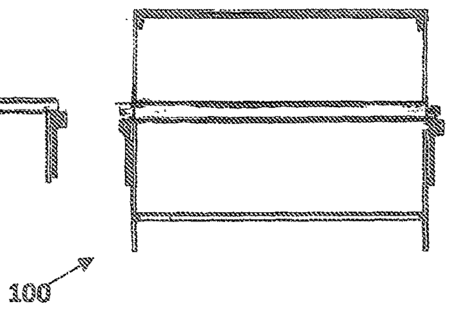
FIG. 5G shows a top view of the door 100 in a position intermediate substantially open and substantially closed positions.
Figure 5H:
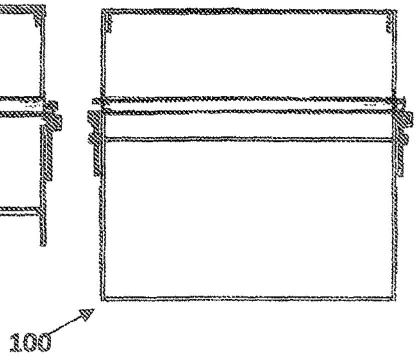
FIG. 5H shows a top view of the door 100 in a substantially open position.

FIGS. 5-5H provide a series of elevational views (FIG. 5, FIG. 5A, and FIG. 5B), a series of side views (FIG. 5C, FIG. 5D, and FIG. 5E), and a series of top views, (FIG. 5F, FIG. 5G, and FIG. 5H), of the tilt-up door 100 according to the invention installed in an appropriately dimensioned opening in a building; wherein, in each series of views, the left-most view (FIGS. 5, 5C, and 5F), the door 100 is shown in an initially substantially vertical, substantially closed position, while in the middle views, (FIG. 5A, FIG. 5D, and FIG. 5G), the door is shown in a position intermediate substantially open and substantially closed, and in the right hand series of views (FIG. 5B, FIG. 5E, and FIG. 5H), the door is shown in its substantially horizontal, substantially open position, respectively.

While exemplified herein above by motors 313 and 314, the drive mechanism for causing each pivot point and pivot translation point 113/321 and 114/322, alternative motive mechanisms known in the art may be included, instead of or in addition to said motors. For example, such mechanisms may include vertically extending hydraulic cylinders, each including a piston which is vertically movable with a distal end connected to the pivot point and pivot translation point 113/321 and 114/322 to cause motion thereof when activated. Likewise, alternatively, the tilt-up door 100 may include cables connecting the first and second pivot translation points to the actuator, and the actuator can be a linear actuator positioned above the door opening and can have the moving portion connected to the cables to move the pivot point and pivot translation point 113/321 and 114/322. Alternately the actuator can be a winch positioned above the door opening and the cables can be connected to the winch drum to move the pivot point and pivot translation point 113/321 and 114/322. The tilt-up door 100 can include cables with a first end anchored to an anchor positioned adjacent to top of each of the vertical columns 300. Each of the first and second carriages can include a pulley and the cables can pass over the pulley and the second end of the cables can be connected to the actuator (e.g. a motor) to move the first and second pivot point and pivot translation point 113/321 and 114/322. Alternatively, the tilt-up door 100 can further include first and second pulley blocks that can have a pulley and a connector and the pulley blocks can be slidably carried in a slot of the vertical columns 300.

Those skilled in the art, based on the present disclosure, will appreciate that various embodiments of the tilt-up door 100 may include, for example, a passage door or like access doors, windows, and the like within the door frame for access to the building, without the need to open the entire door. Other modifications, variations, embellishments, or equivalents of the various elements of the invention come within the scope of the appended claims. Furthermore, while the invention has been specifically described in connection with certain specific embodiments thereof, it is to be understood that this is by way of illustration and not by way of limitation. For the scope of the invention disclosed herein, reference should be had to the appended claims and their equivalents.

What is claimed is:

1. A tilt-up door for a building, the building having a door opening to be closed by said tilt-up door when in a vertical closed position, the door being movable in an opening cycle to a generally horizontal open position and being movable in a closing cycle from the open position to the closed position, said door comprising, when in said closed position:

a. a door frame including at least top and bottom horizontal members, and at least left and right vertical side members each connected to the top and bottom horizontal members at opposite ends of the top and bottom horizontal members and a barrier affixed to said door frame;

b. each of the left and right vertical side members includes a pivot point positioned between the top and bottom horizontal members of said door frame, said pivot points engaged with an actuation mechanism which when powered raises or lowers said pivot points;

c. first and second cams, each mounted to a respective one of the vertical side members of said door frame, a lower end of each of said cams is affixed to the respective one of the vertical side members at a position at or slightly above a point approximately half-way down the respective one of the vertical side members, and each said cam extending from the lower end thereof upwardly and arcuately toward an interior of the building to a distal upper terminal end of said cam, said distal upper terminal end of each of said first and second cams contacts a cam follower, said cam followers extend toward each other approximately at a right angle with respect to said vertical side members and parallel to the top horizontal member, wherein as the door moves between the closed position and the open position, the cam followers slide along the first and second cams and guide the first and second cams and the door; and d. said actuation mechanism, when powered, causes each said pivot point to move, thereby causing the door to move between the open and closed positions.

2. The tilt-up door according to claim 1, wherein said actuation mechanism is substantially housed within at least one support structure adjacent said door opening.

3. The tilt-up door according to claim 1, wherein each said cam follower is mounted to a distal end of a substantially horizontally oriented cam follower support bar, each said support bar is mounted to a support column adjacent said door opening and is oriented at approximately a right angle with respect to the top horizontal member and to each of said vertical side members, when the door is in the closed position.

4. The tilt-up door according to claim 3, wherein interaction between said cams and said cam followers cause said door to follow an arcuate path as the door is moved between the open and closed positions.

5. The tilt-up door according to claim 4, wherein said actuation mechanism comprises an actuator connected to the pivot points and operable to cause said pivot points to move vertically upward or downward, whereby the door is mounted for vertical movement and for tilting movement about said pivot points when the actuator is operated.

6. The tilt-up door according to claim 5, wherein the actuator comprises first and second motors which, when activated, cause rotation of first and second drive screws which causes said pivot points to move.

7. The tilt-up door according to claim 5, wherein the actuator comprises vertically extending hydraulic actuators, each said hydraulic actuator having a vertically movable piston having a distal end thereof connected to a respective one of the first and second pivot points.

8. The tilt-up door according to claim 5, wherein the actuator comprises a linear actuator and cables.

9. The tilt-up door according to claim 5, wherein the actuator comprises a drum and cables.

10. A system comprising a tilt-up door for a building, said building having a door opening to be closed by said tilt-up door when in a vertical closed position, the door being movable in an opening cycle to a generally horizontal open position and being movable in a closing cycle from the open position to the closed position, said door comprising, when in said closed position:

a. a door frame including at least top and bottom horizontal members, and at least first and second vertical side members each connected to the top and bottom horizontal members at opposite ends of the top and bottom horizontal members and a barrier affixed to said door frame;

b. each of the vertical side members includes a pivot point positioned between the top and bottom horizontal members of said door frame, said pivot points engaged with an actuation mechanism which when powered raises or lowers said pivot points;

c. first and second cams, each mounted to a respective one of the vertical side members of said door frame, a lower end of each of said cams is affixed to the respective one of the vertical side members at a position at or slightly above a center point of the door frame, and each said cam extending from the lower end thereof upwardly and arcuately toward an interior of the building to a distal upper terminal end of said cam, said distal upper terminal end of each of said first and second cams contacts a cam follower, said cam followers extend toward each other approximately at a right angle with respect to said vertical side members and parallel to the top horizontal member, wherein as the door moves between the closed position and the open position, the cam followers slide along the first and second cams and guide the first and second cams and the door; and d. said actuation mechanism, when powered, causes each said pivot point to move, thereby causing the door to move between the open and closed positions.

11. A method of closing a door opening of a building, comprising:

a. providing a door having a vertical closed position and being movable in an opening cycle to a generally horizontal open position and being movable in a closing cycle from the open position to the closed position;

b. providing a door frame including at least top and bottom horizontal members, at least left and right vertical side members each connected to the top and bottom horizontal members at opposite ends of the top and bottom horizontal members and a barrier fixed to said door frame;

c. each of the left and right vertical side members includes a pivot point positioned between the top and bottom horizontal members of said door frame, said pivot points engaged with an actuation mechanism which when powered raises or lowers said pivot points;

d. providing first and second cams, each mounted to a respective one of the vertical side members of said door frame, a lower end of each of said cams is affixed to the respective one of the vertical side members at a position at or slightly above a point approximately half-way down the respective one of the vertical side members when the door is in the closed position, and each said cam extending from the lower end thereof upwardly and arcuately toward an interior of the building to a distal upper terminal end of said cam when the door is in the closed position, said distal upper terminal end of each of said first and second cams contacts a cam follower when the door is in the closed position, said cam followers extend toward each other approximately at a right angle with respect to said vertical side members and parallel to the top horizontal member, wherein as the door moves between the closed position and the open position, said cam followers slide along the first and second cams and guide the first and second cams and the door; and e. said actuation mechanism, when powered, causes each said pivot point to move, thereby causing the door to move between the open and closed positions.

* * * * *